UNITED STATES PATENT OFFICE.

HANS CHRISTENSEN, OF HALLE, GERMANY.

PROCESS FOR PRODUCING SUBSTITUTES FOR LITHOGRAPHIC STONES OR METAL PLATES.

991,273.

Specification of Letters Patent.

Patented May 2, 1911.

No Drawing.

Application filed July 21, 1909. Serial No. 508,859.

*To all whom it may concern:*

Be it known that I, HANS CHRISTENSEN, of Halle, Germany, have invented new and useful Improvements in Processes for Producing Substitutes for Lithographic Stones or Metal Plates, of which the following is a specification.

The invention relates to the production of a substitute for natural lithographic stones and consists in applying to a backing a coating which serves as the printing surface. A roughened or grained plate formed from stone, sheet zinc, or other metal is heated to a temperature of 90° C., then suitably treated by means of an atomizer with a solution formed by adding sodium aluminate $Al(ONa)_3$ or a mixture of sodium hydrate NaOH and aluminium hydrate $Al(OH)_3$ to water saturated with carbon dioxid $CO_2$.

The action of the carbon dioxid on the sodium aluminate solution is expressed by the following equation:—

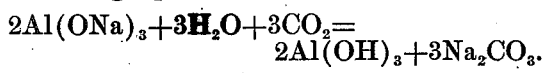

$$2Al(ONa)_3 + 3H_2O + 3CO_2 = 2Al(OH)_3 + 3Na_2CO_3.$$

The carbon dioxid is not supplied in sufficient quantity for the whole quantity of sodium aluminate present in the solution to be decomposed, but in such proportion that a portion remains undecomposed in the liquid so that the liquid used for spraying on the plates is finally of the following character:

$$Al(ONa)_3 + Na_2CO_3 + Al(OH)_3.$$

The separated aluminium hydroxid is allowed to settle, the solution applied to the hot plate is allowed to evaporate and the plate washed. The sodium aluminate is surrounded by carbon dioxid during the electrical chemical process. This method of coating, drying, and washing the plate is repeated several times until the coating formed is of sufficient thickness.

I claim—

1. The herein described process comprising covering a backing with a liquid containing $Na_2CO_3$ and $Al(NaO)_3$ in suspension, evaporating the solution and finally washing the backing.

2. The herein described process comprising heating a backing plate, then applying thereto a liquid containing $Na_2CO_3$ and $Al(NaO)_3$ in suspension and after the solution has evaporated on the hot plate washing the plate.

HANS CHRISTENSEN.

Witnesses:
 RUDOLPH FRICKE,
 J. CHRISTENSEN.